(12) United States Patent
Sodagar

(10) Patent No.: US 12,627,839 B2
(45) Date of Patent: May 12, 2026

(54) SIGNALING CMAF SWITCHING SETS IN ISOBMFF USING EXTENDED TRACK SELECTION BOX

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 168 days.

(21) Appl. No.: 18/408,916

(22) Filed: Jan. 10, 2024

(65) Prior Publication Data

US 2024/0236375 A1 Jul. 11, 2024

Related U.S. Application Data

(60) Provisional application No. 63/460,562, filed on Apr. 19, 2023, provisional application No. 63/438,480, filed on Jan. 11, 2023.

(51) Int. Cl.
| | |
|---|---|
| *H04N 19/70* | (2014.01) |
| *H04N 19/136* | (2014.01) |
| *H04N 19/169* | (2014.01) |

(52) U.S. Cl.
CPC ........... *H04N 19/70* (2014.11); *H04N 19/136* (2014.11); *H04N 19/1887* (2014.11)

(58) Field of Classification Search
CPC .............. H04N 19/1887; H04N 19/70; H04N 19/136
See application file for complete search history.

(56) References Cited

U.S. PATENT DOCUMENTS

| | | | | |
|---|---|---|---|---|
| 2011/0064146 A1* | 3/2011 | Chen | .............. | H04N 21/234327 |
| | | | | 375/240.26 |
| 2018/0103271 A1* | 4/2018 | Wang | ...................... | H04L 65/65 |
| 2022/0124135 A1* | 4/2022 | Wang | ................... | H04L 65/612 |
| 2022/0335978 A1* | 10/2022 | Kondrad | ................ | H04N 21/84 |

OTHER PUBLICATIONS

Information technology—Coding of audiovisual objects—ISO base media file format by ISO, "ISO".*
"CTA Specification-Web Application Video Ecosystem—DASH-HLS Interoperability Specification" by CTA.*
CTA Specification, Web Application Video Ecosystem-DASH-HLS Interoperability Specification, CTA-5005, May 2021,URL:https://cdn.cta.tech/cta/media/media/resources/standards/pdfs/cta-5005-final.pdf >, entire document (44pages).

(Continued)

*Primary Examiner* — Neil R Mikeska
(74) *Attorney, Agent, or Firm* — Sughrue Mion, PLLC

(57) ABSTRACT

There is included a method and apparatus comprising computer code configured to cause a processor or processors to perform obtaining International Organization for Standardization base media file format (ISOBMFF) files associated with a video data, determining from the ISOBMFF files at least one of a track selection box indicating properties of switching sets of the ISOBMFF files and a track group box indicating a hierarchical grouping of track groups, and decoding the video data based on the at least one of the track selection box and the track group box.

14 Claims, 16 Drawing Sheets

100

(56) References Cited

OTHER PUBLICATIONS

ISO, "Information technology—Coding of audiovisual objects—ISO base media file format", ISO/IEC 14496-12, Dec. 15, 2015, https://www.iso.org/standard/83102.html >, entire document (3 pages).

Written Opinion of the International Searching Authority dated May 20, 2024 in Application No. PCT/US24/11174.

International Search Report dated May 20, 2024 in Application No. PCT/US24/11174.

* cited by examiner

```
aligned(8) class TrackSelectionBox
    extends FullBox('tsel', version = 1, 0) {
    template int(32) switch_group =0;
    template int(32) switchable_switch_group =0;
    template int(16) alternate_group = 0;
    unsigned int(32) track_group_id;
    unsigned int(8)  aligned;
    unsigned int(8)  single_init;
    unsigned int(8)  principal;
    utf8string      structural_brand;
    utf8string      mediaprofile_brand;
}
```

```
aligned(8) class CMAFSwtichingGroupEntryBox
    extends TrackGroupEntryBox('cmsg', version=0, flags)
{
    unsigned int(8) num_tracks;
    unsigned int(8) aligned;
    unsigned int(8) single_init;
    unsigned int(8) principal;
    utf8string structural_brand;
    utf8string mediaprofile_brand;
}
```

```
aligned(8) class TrackGroupDescriptionBox extends Box('tkgd')
{
    Box boxes[];
} aligned(8) abstract class TrackGroupEntryBox (unsigned int(32)
track_group_entry_type, unsigned int(8) version, unsigned int(24) flags)
extends FullBox(track_group_entry_type, version, flags)
{
    unsigned int(32) track_group_id;
    // the remaining data may be specified
    // for a particular track_group_entry_type
}
```

```
aligned(8) class TrackGroupDescriptionBox extends Box('tkgd')
{
    Box boxes[];
} aligned(8) abstract class TrackGroupEntryBox (unsigned int(32)
track_group_entry_type, unsigned int(8) version, unsigned int(24)
flags) extends FullBox(track_group_entry_type, version, flags)
{
    unsigned int(32) track_group_id;
    unsigned int(32) parent_group_id;
    // the remaining data may be specified
    // for a particular track_group_entry_type
}
```

FIG. 16

SIGNALING CMAF SWITCHING SETS IN ISOBMFF USING EXTENDED TRACK SELECTION BOX

CROSS REFERENCE TO RELATED APPLICATION

The present application claims priority to provisional application U.S. 63/438,480, filed on Jan. 11, 2023, and to provisional application 63/460,562, filed on Apr. 19, 2023, the contents of which are hereby expressly incorporated by reference, in their entirety, into the present application.

BACKGROUND

1. Field

The present disclosure is directed to signaling Common Media Application Format (CMAF) Switching sets in the International Organization for Standardization base media file format (ISOBMFF) file, the properties of the switching sets, and the associated tracks using a new version of the ISOBMFF switching groups. Embodiments herein also provide signaling of multi-level grouping of tracks in an ISOBMFF file where at each level of track grouping, the properties of that grouping is defined.

2. Description of Related Art

ISOBMFF is a widely used file format for media content. The CMAF standard defines common media format tracks that can be grouped as switching sets. The CMAF switching sets are used for delivering media with alternative tracks. The alternative tracks represent the same content but they have different attributes such as bitrate, resolution, frame rate, and other possible characteristics. While the CMAF standard uses ISOBMFF as the track format, it does not include any specific method for signaling the existence of CMAF switching sets. Up to now, out-of-band signaling such as DASH manifest is used for such signaling.

There is no defined standard method for signaling the existence of CMAF switching sets in an ISOBMFF file. There is also no efficient solution in ISOBMFF standards that allows a multiple-level grouping of tracks, for instance, a preselection grouping of CMAF switching sets.

SUMMARY

To address those technical problems, embodiments herein represent a design that uses two boxes. A new version of the track selection box that provides information about switching sets, switchable switching sets, selectable sets, and the general properties of the switching sets. In the track group box to provide switching group parameters for the entire file. As such, there is hereby disclosed a method for signaling the existence, the association of tracks and properties of one or more CMAF switching sets in an ISOBMFF file, wherein the identification of switching set is signaled using a new switching group box, wherein it contains also possible switchable switching sets, where the switching is possible to cross switch groups, wherein the selectable switching groups are also signaled and the properties of each switching group are described.

To further address those technical problems, embodiments herein further represent the definition, use, and signaling of a track group box in the track group entry box enabling the hierarchical grouping of the track groups without addition of any new parameters. As such, there is provided a method of defining the hierarchical track groups in ISOBMFF files where a track group can be a member of another track group, wherein a multi-level grouping of tracks can be achieved, wherein the addition of the track group description box to the track group entry box allows the entry box to become a member of another track group box, and the properties of this track entry box as a member of the other track group box expressed, wherein a track entry box can be a member of more than one track group by including two or more track group boxes in it wherein such design allows flexible multi-level multi-branch hierarchical track grouping where a track group can be a member of multiple track groups and therefore share various and different properties with different track groups.

To address one or more different technical problems, there is included a method and apparatus comprising memory configured to store computer program code and a processor or processors configured to access the computer program code and operate as instructed by the computer program code. The computer program code includes obtaining code configured to cause the one or more processors to obtain International Organization for Standardization base media file format (ISOBMFF) files associated with a video data; determining code configured to cause the one or more processors to determine from the ISOBMFF files at least one of a track selection box indicating properties of switching sets of the ISOBMFF files and a track group box indicating a hierarchical grouping of track groups; and decoding code configured to cause the one or more processors to decode the video data based on the at least one of the track selection box and the track group box.

The track selection box may be contained in a user data box of a track that the track selection box modifies The track selection box may specify any one or more of a group of tracks, a switch group of groups, including the group of tracks, of the ISOBMFF files, whether the switch group of the groups belongs to another group, an aligned common media application format (CMAF) switching set, a CMAF switching set with a single initialization segment for all of the tracks, whether an initialization segment may be used for any track in the switch group, and a CMAF structural brand of the tracks.

The track group box may specify that a track grouped by a common media application format (CMAF) switching track group is a track with an alternate group equal to an ID of the CMAF switching track group.

The track group box may specify any one or more of an aligned common media application format (CMAF) switching set, a CMAF switching set with a single initialization segment for all of tracks of the ISOBMFF files, that an initialization segment may be used for any track in a switch group, and a CMAF structural brand of the tracks.

The track group box may be included in a track group description box, and the track group description box comprises an array of track group entry boxes each of which indicating characteristics of ones of track groups.

The track group box indicates a reference from a cmsg box to a prse box of an ISOBMFF moov box.

The track group description box comprises another track group entry box, other than the track group entry boxes of the array of track group entry boxes, pointing to a preselection track group entry box comprising common media application format (CMAF) track group boxes.

A second track group entry box, of the array of track group entry boxes of the track group description box, may include a same track group entry type as the track group entry box and comprises a different track group identifier than the track group entry box.

The same track group entry type may indicate a 4CC code.

BRIEF DESCRIPTION OF THE DRAWINGS

Further features, nature, and various advantages of the disclosed subject matter will be more apparent from the following detailed description and the accompanying drawings in which:

FIG. 3 is a simplified block diagram regarding decoders in accordance with embodiments;

FIG. 4 is a simplified block diagram regarding encoders in accordance with embodiments;

FIG. 7 is an example syntax in accordance with embodiments;

FIG. 8 is an example syntax in accordance with embodiments;

FIG. 10 is a simplified diagram in accordance with embodiments;

FIG. 11 is a simplified diagram in accordance with embodiments;

FIG. 12 is an example syntax in accordance with embodiments;

FIG. 13 is a simplified diagram in accordance with embodiments;

FIG. 14 is a simplified diagram in accordance with embodiments;

FIG. 16 is simplified diagram in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
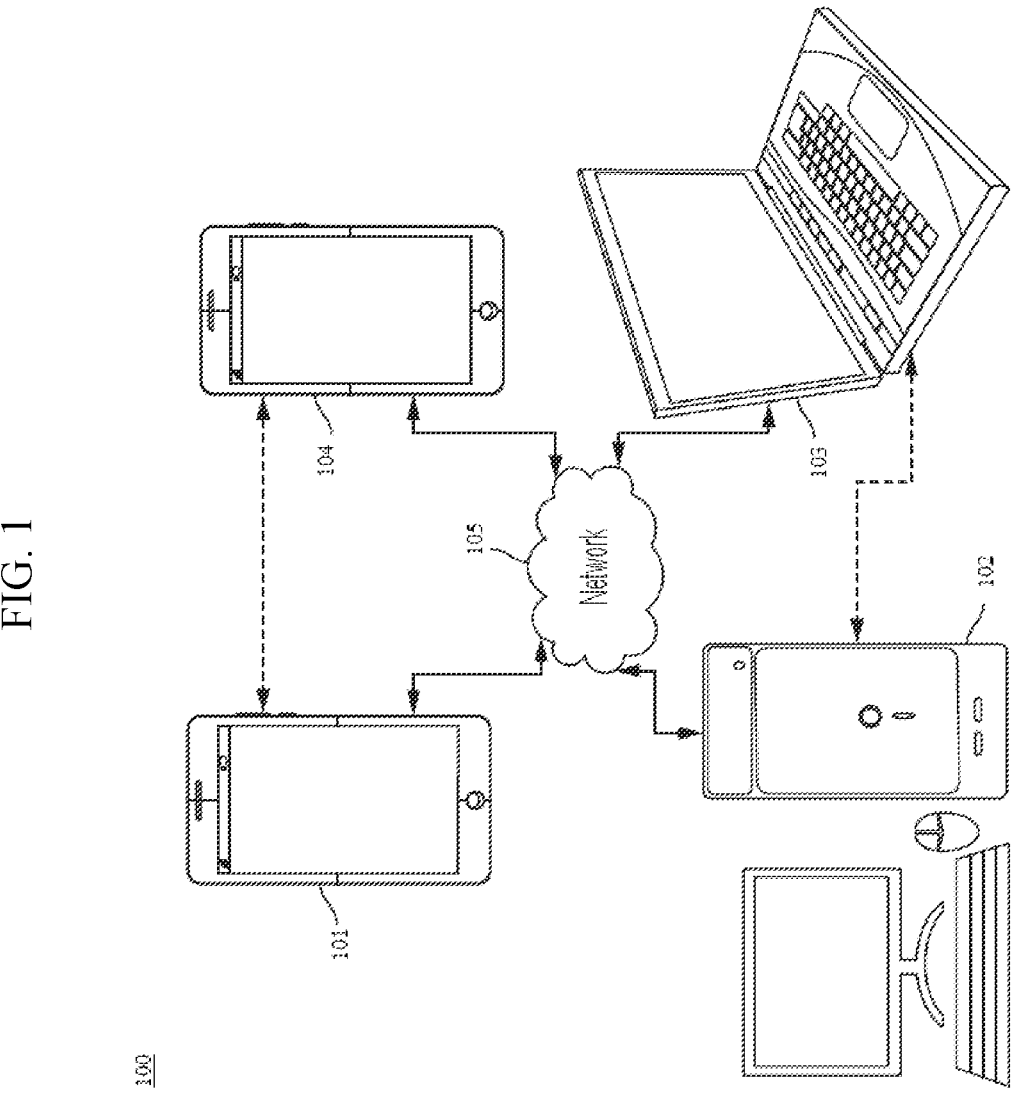
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
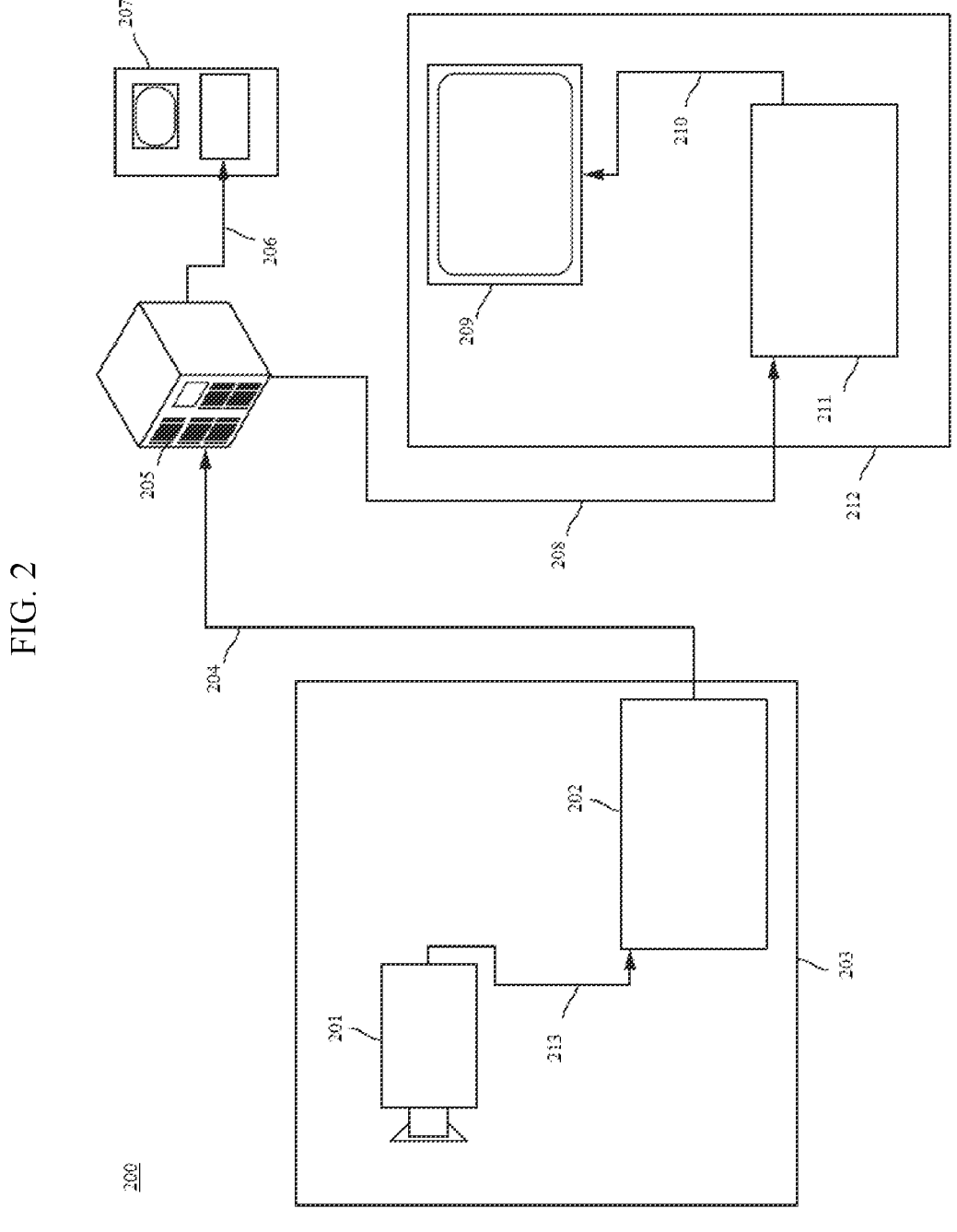
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
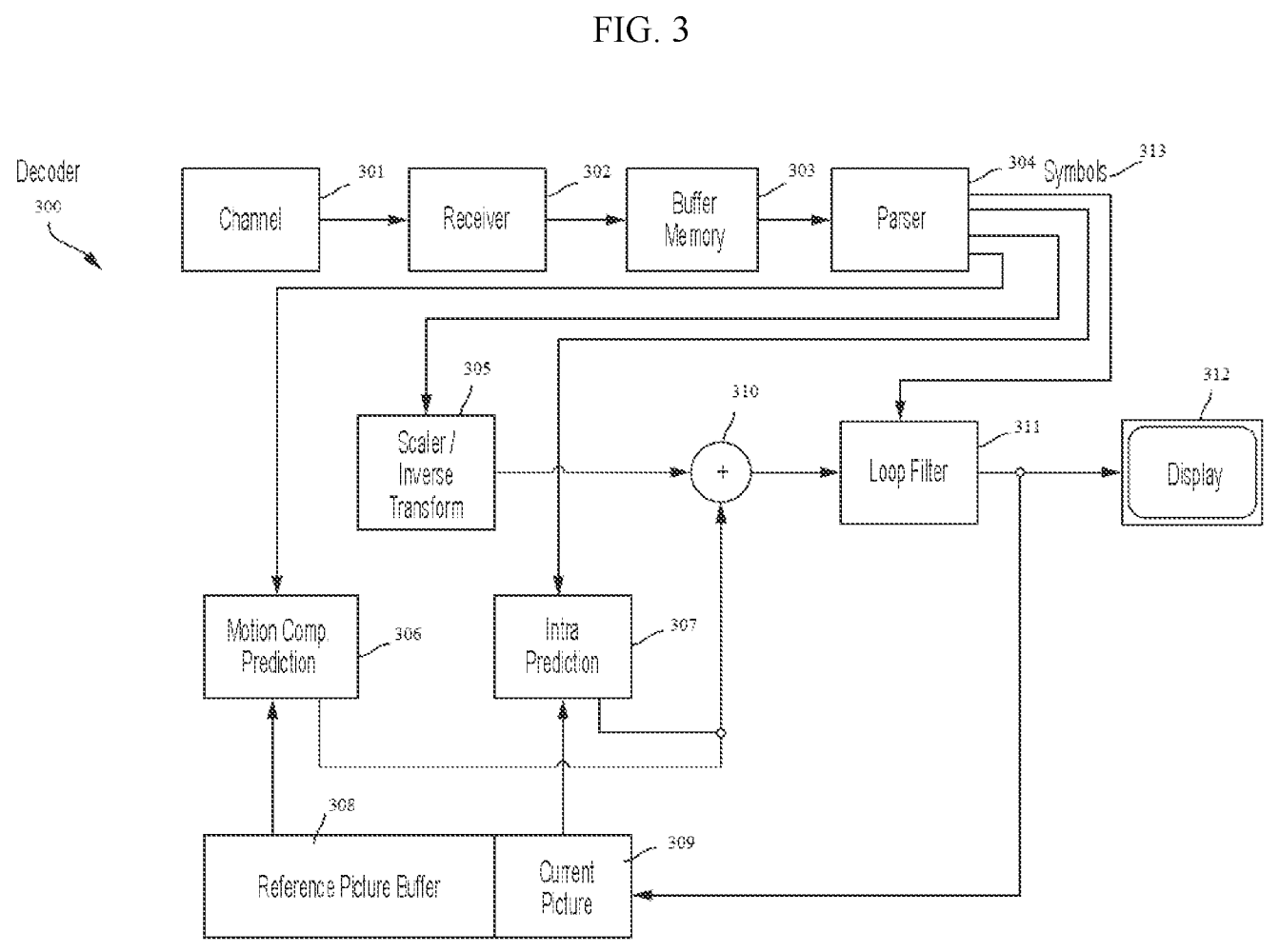

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec.

H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
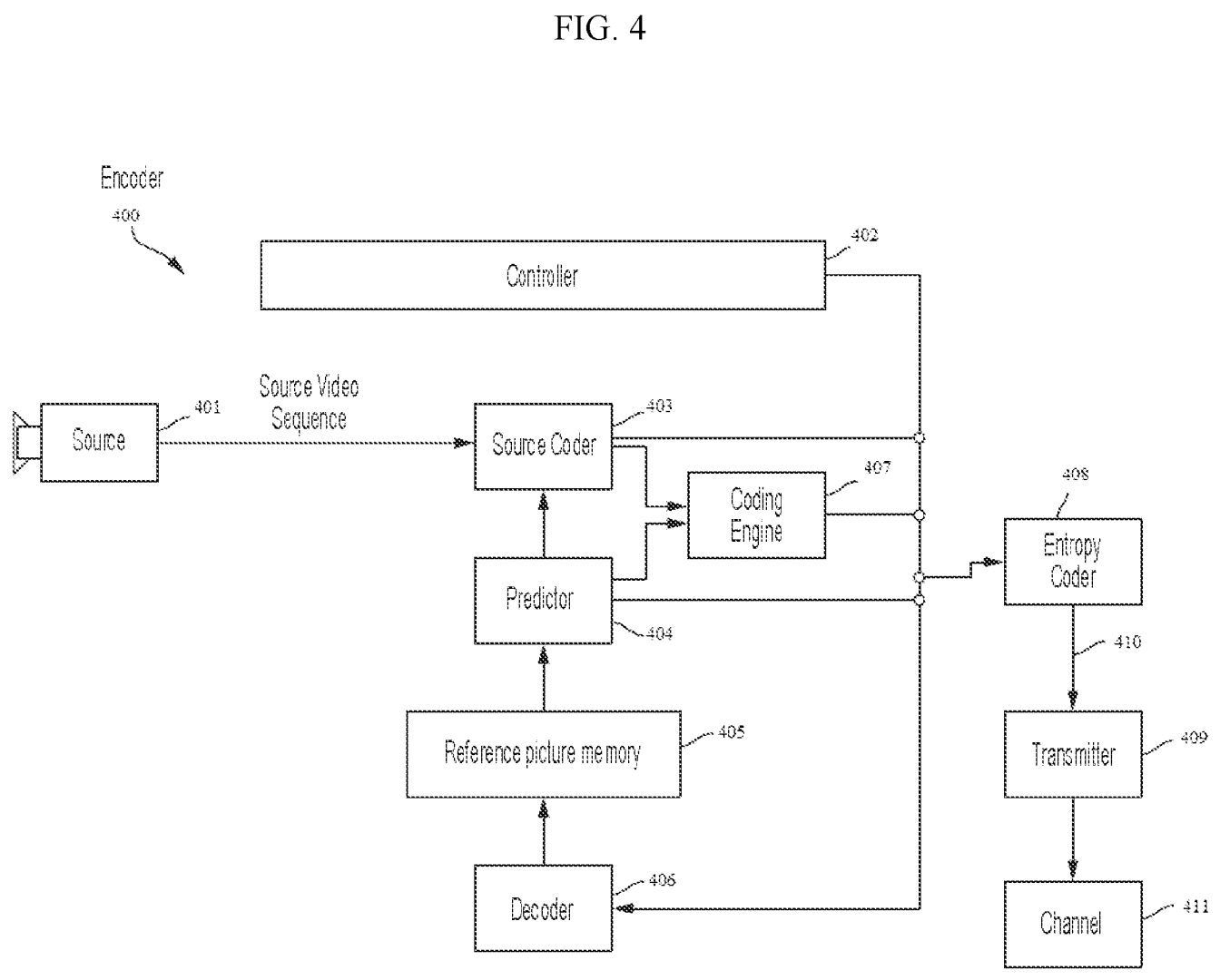

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
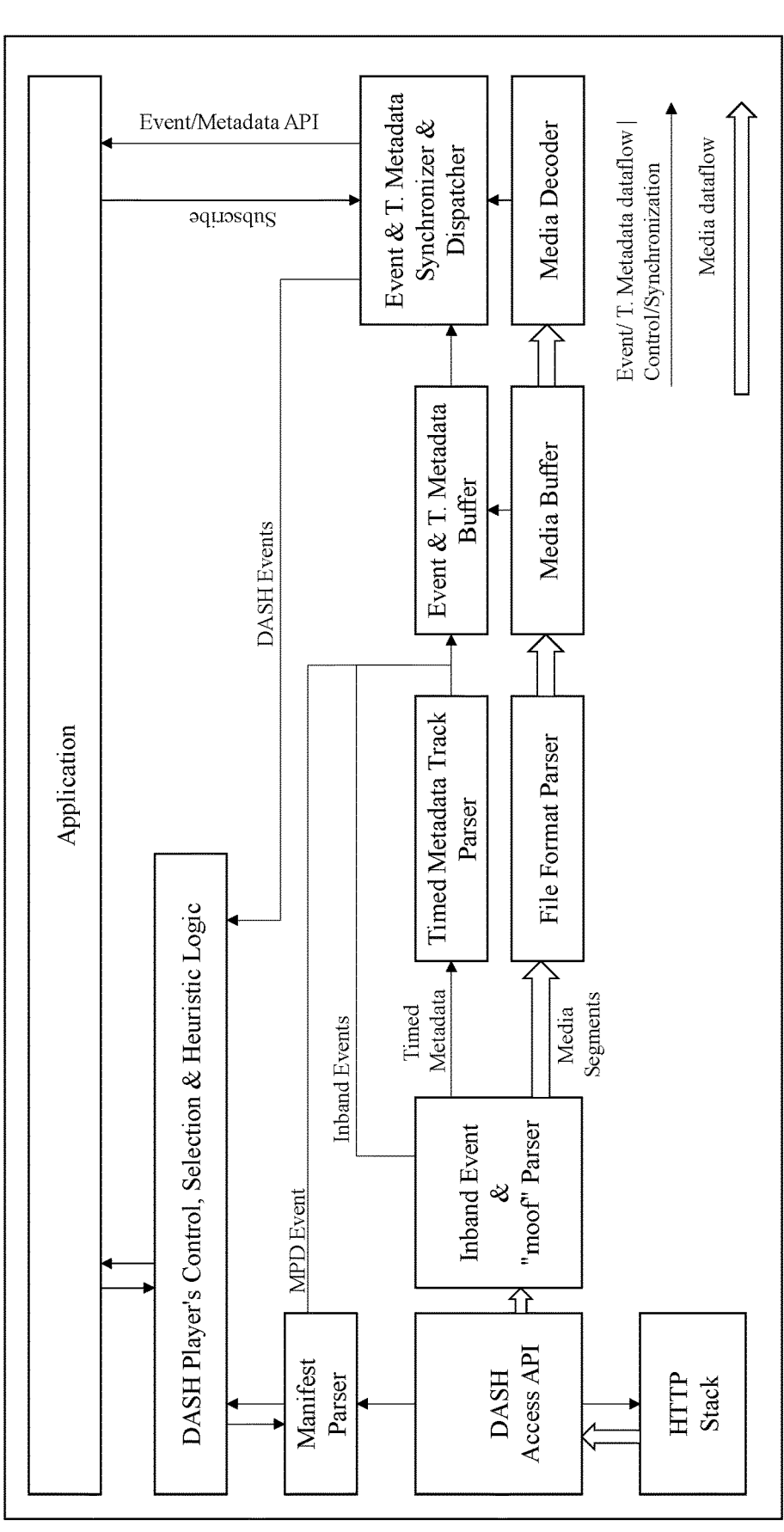
FIG. 5 is a simplified block diagram in accordance with embodiments.

FIG. 5 shows a sample DASH client processing model 500, such as of a client sample architecture for processing DASH and Common Media Application Format (CMAF) events, in which a client request of media segments may be based on described addresses in a manifest which also described metadata tracks from which a client may access segments of metadata tracks, parse them, and send them to an application. Further, according to exemplary embodiments, of addresses for media segments such as described below, a DASH manifest may provide addressed for Index segments. Each index segment may provide information about one segment duration and size, and a Representation Index may provide the index information for all segments of a given representation.

Figure 6:
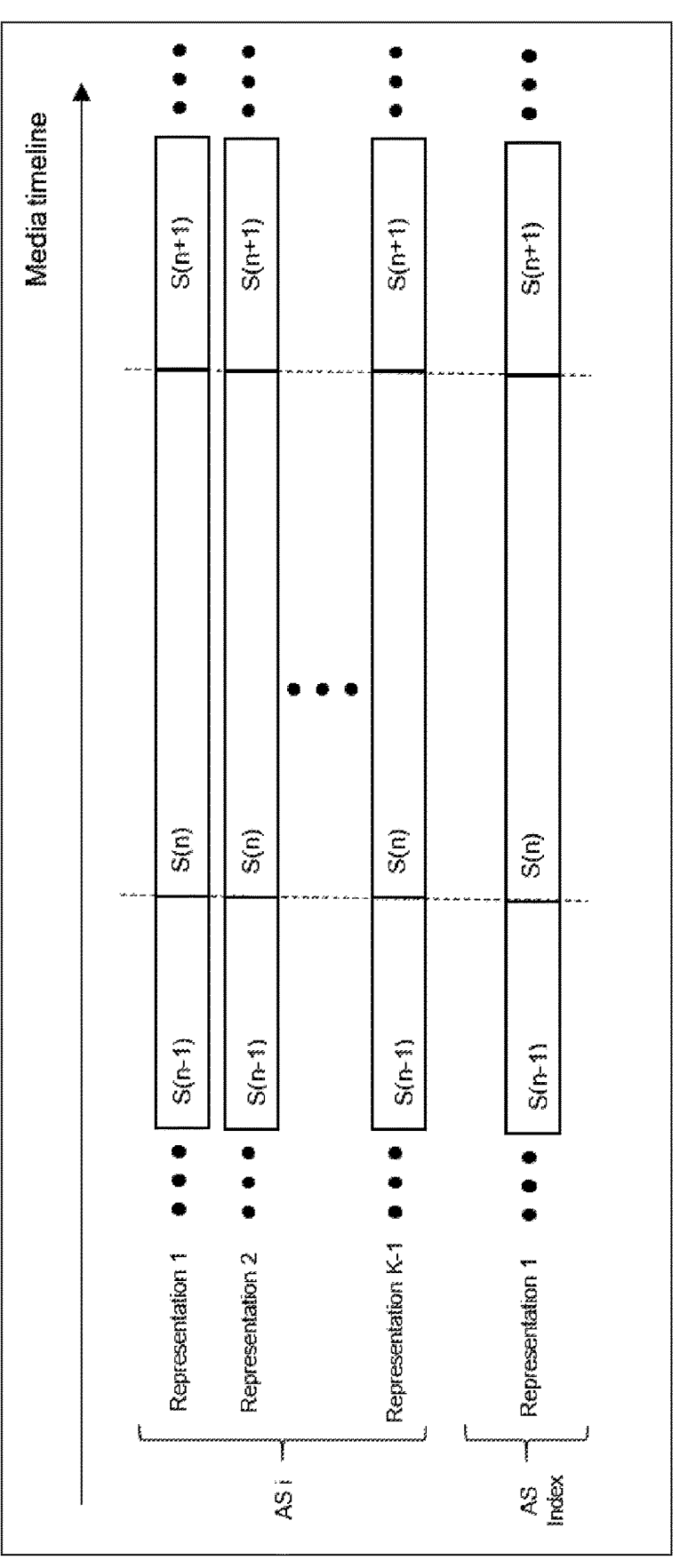
FIG. 6 is a simplified diagram in accordance with embodiments.

FIG. 6 shows an example 600 for a sample of a metadata track for adaptation set segment indexing such as for any given adaptation set. For example, for each adaptation set (AS) that the instantaneous segment bandwidth is expected to be signaled, a separate adaptation set may also be included in the manifest, as shown in FIG. 6.

As shown in FIG. 6, for an AS i with k media representation that their segments are timed aligned, a new adaptation set AS index is added to the manifest that contains a single representation. This single representation is a timed metadata track that its segments are also timed aligned with the segments of the AS i representations.

Figure 9:
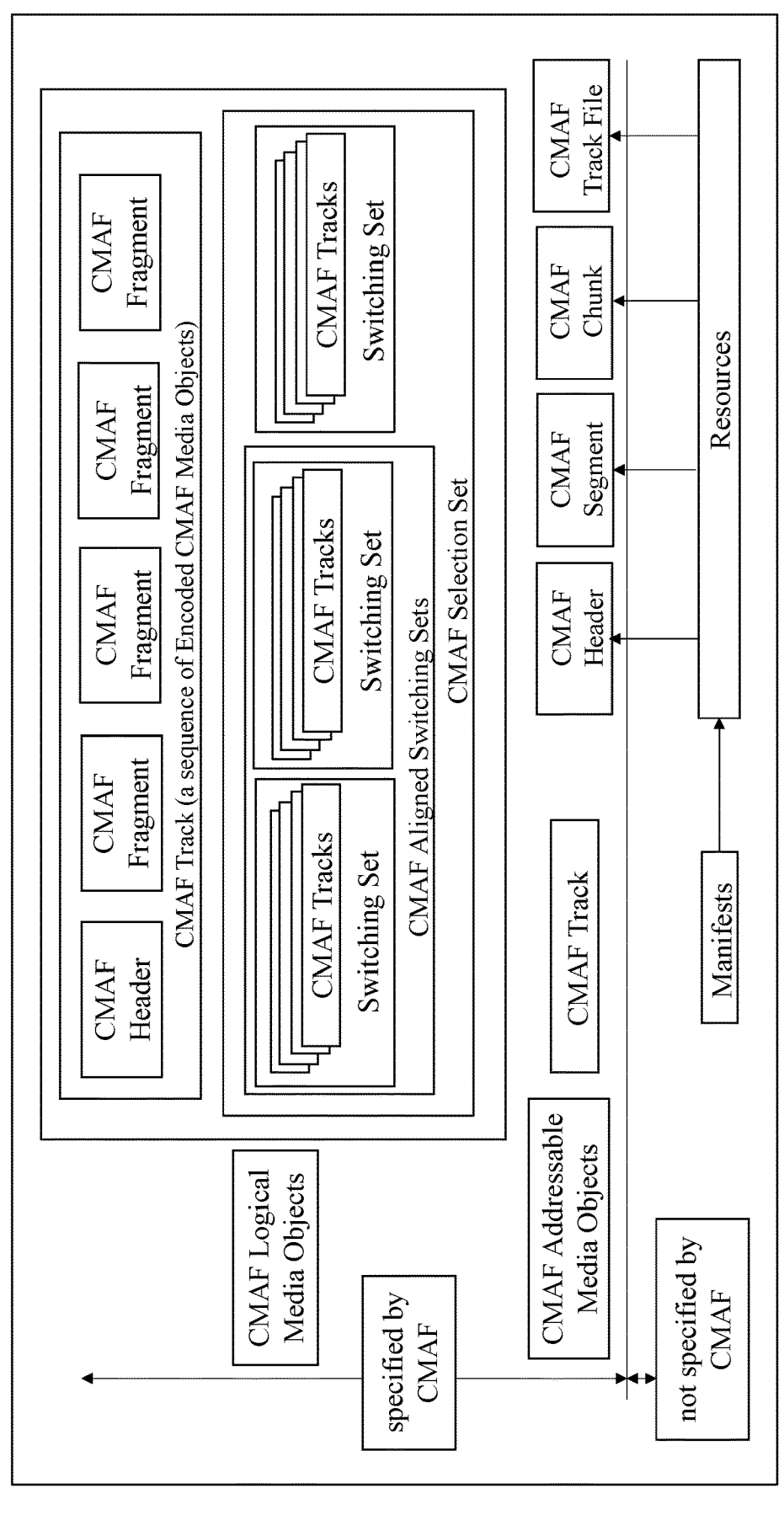
FIG. 9 is a simplified diagram in accordance with embodiments.

FIG. 9 shows an example 900 of the CMAF tracks and CMAF switching sets defined by CMAF according to exemplary embodiments. A CMAF switching is a set of CMAF tracks that have some common constraints. The main purpose of a CMAF switching set is to provide alternate representations of the same content in multiple tracks so that during the delivery or playback, the player can switch between tracks to accommodate the network bandwidth variation and other varying properties. The CMAF standard uses ISOBMFF for the track formats, but it does not provide a standard to signal the existence of a CMAF switching set in the ISOBMFF file.

Embodiments herein introduce a new version of the ISOBMGG track selection box with unique properties. This new box contains several parameters to signal a CMAF switching set and its properties.

According to embodiments, there is a version 1 switching group which may (i) use switching group id to identify this group, (ii) alternate group id (for selection list), (iii) have switchable group id, (iv) track group id for preselection associations, and (v) indicate CMAF parameters.

Embodiment herein provide the following definition:

Box type: 'tsel'

Container: UserDataBox of the corresponding TrackBox

Mandatory: No

Quantity: Zero or One

Such track selection box is contained in the user data box of the track it modifies.

As shown in FIG. 7, embodiments herein provide and utilize example 700.

The switch_group syntax of example 700 is an integer that specifies a group or collection of tracks. If this field is 0 (default value) or if the TrackSelectionBox is absent there is no information on whether the track can be used for switching during playing or streaming. If this integer is not 0, it shall be the same for tracks that can be used for switching between each other. Tracks that belong to the same switch group. A switch group may have only one member.

The Switchable_switch_group syntax of example 700 is an integer that specifies a group of switchable switch groups. If this field is 0 (default value) or if the TrackSelectionBox is absent there is no information on switchable switch groups. If this integer is not 0, it shall be the same for all switchable groups that can be used for switching between each other. A switchable switch group may have only one member.

The alternate_group syntax of example 700 is an integer that specifies that the switch group belongs to a group or collection of tracks and/or sub-tracks. If this field is 0 (default value), then there is no information on possible relations to other tracks/sub-tracks. If this field is not 0, it should be the same for switchable groups/tracks/sub-tracks that contain alternate data for one another and different for switchable groups/tracks/sub-tracks belonging to different such groups. Only switchable groups/one track/subtrack within an alternate group should be played or streamed at any one time.

The track_group_id syntax of example 700 is an integer that specifies the track group this switching set belongs to. If this field is 0 (default value) or if the TrackSelectionBox is absent there is no information on track groups. If this integer is not 0, it shall be the same for all switchable groups or tracks that belong to the same track group.

The aligned syntax of example 700 indicates an aligned CMAF Switching set when it is set to a 1. Otherwise, it shall be set to 0. Other values are reserved.

The single_init syntax of example 700 indicates the CMAF Switching set with a single initialisation segment for all tracks when it is set to a 1. Otherwise, it shall be set to 0. Other values are reserved.

The principal syntax of example 700 specifies the track_id of the track that its initialisation segment can be used for the initialisation of any track in this switching group.

The structural_brand syntax of example 700 specifies the CMAF structural brand of all tracks of this switching group.

The mediaprofile_brand syntax of example 700 specifies the media profile brand that all tracks of this switching group conform to.

Embodiment herein provide the following definition:

Box type: 'cmss'

Container: TrackGroupDescriptionBox

Mandatory: No

Quantity: Zero or One

According to exemplary embodiments, CMAF Switching Group defines a set of tracks that are conforming the CMAF switching sets in ISO/IEC 23000-19. A CMAF Switching set can be qualified by its attributes.

According to exemplary embodiments, CMAFSwitching-GroupEntryBox shall describe only track groups identified by track_group_type equal to 'cmsg'.

According to exemplary embodiments, all CMAF Switching Groups with at least one contributing track having the track_in_movie flag set to 1 shall be qualified by CMAFSwitchingGroupEntryBoxes. Otherwise, the presence of the CMAFSwitchingGroupEntryBoxes is optional.

According to exemplary embodiments, all attributes uniquely qualifying a preselection shall be present in CMAFSwitchingGroupEntryBox of the preselection.

As shown in FIG. 8, embodiments herein provide and utilize example 800. According to exemplary embodiments thereof, thereof are such that the box contains information on the CMAF switching group.

The num_tracks syntax of example 800 specifies the number of alternative tracks grouped by this CMAF switching group.

A track grouped by this CMAF switching track group of example 800 is a track with alernate_groupe equal to the ID of this switching group.

The aligned syntax of example 800 indicates an aligned CMAF Switching set when it is set to a 1. Otherwise, it shall be set to 0. Other values are reserved.

The single_init syntax of example 800 indicates the CMAF Switching set with a single initialisation segment for all tracks when it is set to a 1. Otherwise, it shall be set to 0. Other values are reserved.

The principal syntax of example 800 specifies the track_id of the track that its initialisation segment can be used for the initialisation of any track in this switching group.

The structural_brand syntax of example 800 specifies the CMAF structural brand of all tracks of this switching group.

The mediaprofile_brand syntax of example 800 specifies the media profile brand that all tracks of this switching group conform to.

Therefore, viewing the examples 700 and 800, embodiments represent a design that uses two boxes. As in FIG. 15, at S1501, there is defined new version of the track selection box that provides information about switching sets, switchable switching sets, selectable sets, and the general properties of the switching sets. In the track group box to provide switching group parameters for the entire file. As such, there is a method for signaling, at S1502, at least the existence, the association of tracks and properties of one or more CMAF switching sets in an ISOBMFF file, wherein the identification of switching set is signaled using a new switching group box, wherein it contains also possible switchable switching sets, where the switching is possible to cross switch groups, wherein the selectable switching groups are also signaled and the properties of each switching group are described.

Further, FIG. 9 shows the example 900 as CMAF tracks and CMAF switching sets defined by ISO/IEC JTC 1/SC 29/WG03 N00654, and as shown in FIG. 9, the CMAF switching set is a set of CMAF tracks that have some common constraints. The main purpose of a CMAF switching set is to provide alternate representations of the same content in multiple tracks, so that during the delivery or playback, the play can switch between tracks to accommodate the network bandwidth variation and other varying properties.

According to exemplary embodiments, there be involved an ISOBMFF standard definition of track groups for signaling various grouping of tracks:

```
aligned (8) class TrackGroupBox extends Box ('trgr')
{
  Box boxes[ ];
}
aligned (8) class TrackGroupTypeBox(unsigned int(32) track_group_type)
extends FullBox(track_group_type, version = 0, flags)
{
  unsigned int(32) track_group_id;
  // the remaining data may be specified
  //for a particular track_group_type
}
```

According to exemplary embodiments herein, the track_group_type of such definition indicates the track grouping type and shall be set to one of the following values or a value registered, or a value from a derived specification registration:

'mrsc' which indicates that this track belongs to a multi-source presentation (such as specified in 8.3.4.4.1 of the CMAF standard), 'ster' which indicates that this track is either the left or right view of a stereo pair suitable for playback on a stereoscopic display (such as specified in 8.3.4.4.2 of the CMAF standard), and 'pres' which indicates that this track contributes to a preselection (such as specified in 8.3.4.4.3 of the CMAF standard).

The pair of track_group_id and track_group_type identifies a track group. The tracks that contain a particular TrackGroupTypeBox having the same value of track_group_id and track_group_type belong to the same track group.

As shown above, the track group box defines specific properties of group by defining specific four character code (4CC) for each type of grouping. For instance, the preselection group is, according to exemplary embodiments, defined as:

```
aligned(8) class PrselectionProcessingBox
    extends FullBox('prsp', version=0, flags){
    unsigned int(8) track_order;
    unsigned int(1) sample_merge_flag;
    unsigned int(7) reserved;
    // further attributes and Boxes defining additional processing of
    // the track contributing to the preselection
}
```

According to exemplary embodiments herein, the track_order defines the order of this track relative to other tracks in the preselection as described below, and sample_merge_flag equal to 1 indicates that this track is enabled to be merged with another track as described below.

Also a track group entry box defines the properties of a track group:

```
aligned(8) class TrackGroupDescriptionBox extends Box ('tkgd')
{
  Box boxes[ ];
]
aligned(8) abstract class TrackGroupEntryBox (unsigned int(32)
track_group_entry_type, unsigned int(8) version, unsigned int(24)
flags) extends FullBox(track_group_entry_type, version, flags)
{
  unsigned int(32) track_group_id;
  //the remaining data may be specified
  //for a particular track_group_entry_type
}
```

The TrackGroupDescriptionBox contains TrackGroupEntryBoxes.

The track_group_entry_type indicates a 4CC that is associated with a track_group_type.

The pair of track_group_id and track_group_entry_type identifies the track group that the TrackGroupEntryBox describes.

For example, for the case of preselection:

```
aligned(8) class PreselectionTrackGroupEntryBox
    extends TrackGroupEntryBox('prse', version=0, flags)
{
    unsigned int(8) num_tracks;
    utf8string preselection_tag;
    if (flags & 1) {
        unsigned int(8) selection priority;
    }
    //Boxes describing the preselection
}
```

Embodiments herein further provide hierarchical track groups. For example, there may be two or more CMAF switching sets which are a member of a preselection group. The first and the second CMAF switching sets may consist of two and three tracks respectively. As such, if using track groups for representing CMAF switching sets, then:

TABLE 1

| CMAF switching set 1 (track_group_id = 1 ) | CMAF switching set 2 (track_group_id = 2) |
| --- | --- |
| Track 11 | Track 21 |
| Track 12 | Track 22 |
|  | Track 23 |

And then CMAF track group 1 and CMAF track group 2 are members of a preselection track group:

TABLE 2

| Preselection (track_group_id = 3) |
| --- |
| CMAF switching set 1 (track_group_id = 1) |
| CMAF switching set 2 (track_group_id = 2) |

Figure 10:
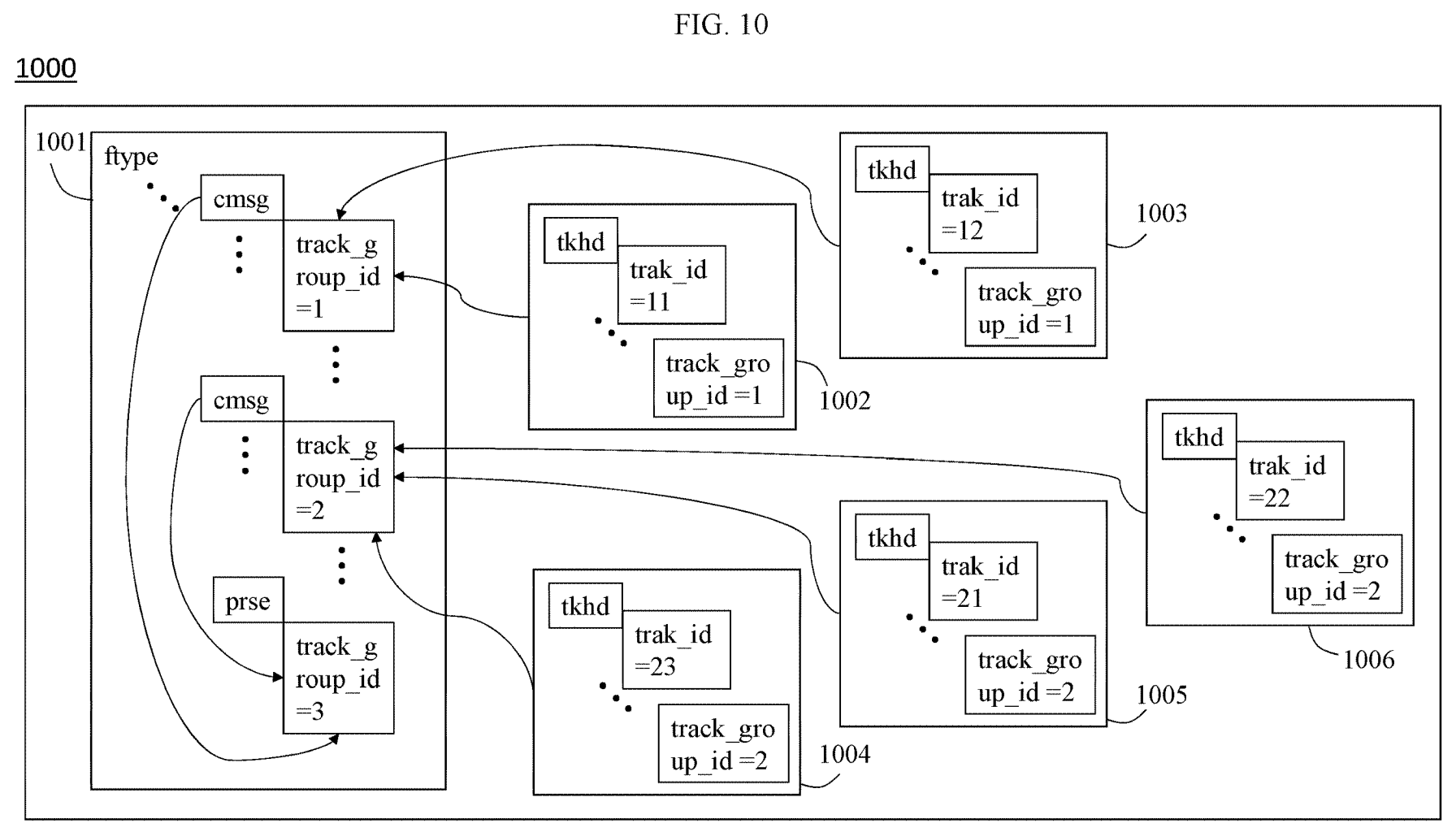

And, according to that exemplary embodiments with such features, FIG. 10 illustrates example 1000 showing signaling of the track groups. The arrows of FIGS. 10, 11, and 13 may be understood to represent logical pointers according to exemplary embodiments.

The following Table 3 represents a greater detail of the track grouping table 1001:

TABLE 3

| ftype | | | |
|---|---|---|---|
| moov | | | |
| | mvhd | | |
| | tkgd | | |
| | | cmsg | |
| | | | track_group_id = 1 |
| | | | num_tracks = 2 |
| | | | aligned = 1 |
| | | | principal_id = 1 |
| | | cmsg | |
| | | | track_group_id = 2 |
| | | | num_tracks = 2 |
| | | | aligned = 1 |
| | | | principal_id = 1 |
| | | prse | |
| | | | track_group_id = 3 |
| | | | num_tracks = 2 |
| | | | Preselection_tag = "pr2" |

The following Table 4 represents a greater detail of the track grouping table 1002:

TABLE 4

| tkhd | | |
|---|---|---|
| | trak_id = 11 | |
| trgr | | |
| | cmgs | |
| | | track_group_id = 1 |

The following Table 5 represents a greater detail of the track grouping table 1005:

TABLE 5

| tkhd | | |
|---|---|---|
| | trak_id = 21 | |
| trgr | | |
| | cmgs | |
| | | track_group_id = 3 |

The following Table 6 represents a greater detail of the track grouping table 1004:

TABLE 6

| tkhd | | |
|---|---|---|
| | trak_id = 23 | |
| | cmgs | |
| | | track_group_id = 2 |

The following Table 7 represents a greater detail of the track grouping table 1003:

TABLE 7

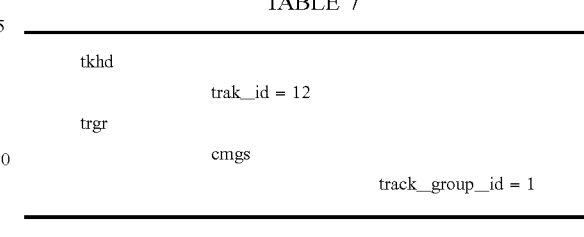

| tkhd | | |
|---|---|---|
| | trak_id = 12 | |
| trgr | | |
| | cmgs | |
| | | track_group_id = 1 |

The following Table 8 represents a greater detail of the track grouping table 1006:

TABLE 8

| tkhd | | |
|---|---|---|
| | trak_id = 22 | |
| trgr | | |
| | cmgs | |
| | | track_group_id = 2 |

As shown in FIG. 10, the hierarchical track grouping needs a reference from cmsg boxes to prse box in the ISOBMFF moov box of track grouping table 1001.

In FIG. 10, the track_group_id information of track grouping tables 1102 and 1003 may be signaled with the corresponding track_group_id of the ISOBMFF moov box track grouping table 1001. The track_group_id information of track grouping tables 1004, 1005, and 1006 in FIG. 10 may be signaled with the corresponding track_group_id of the ISOBMFF moov box track grouping table 1001, and a reference from one or more cmsg boxes of the ISOBMFF moov box of track grouping table 1001 in FIG. 10 is provided to a track_group_id of the prse box thereof.

Figure 11:
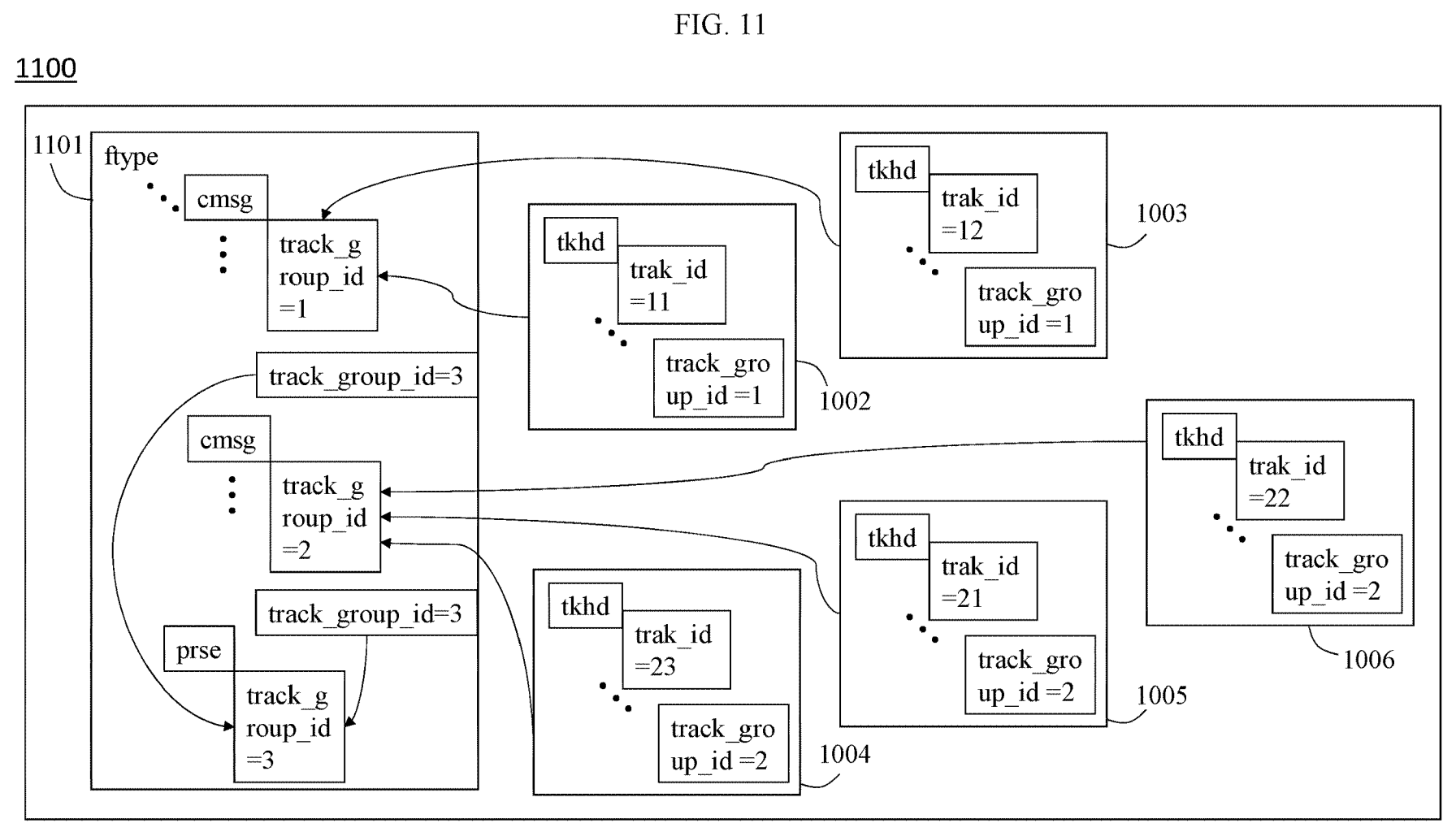

Embodiments herein provide a solution using a track group box in track group description box. For example, as shown in the example 1100 of FIG. 11, one solution is to allow inclusion of track group box in track group description box. That is, according to exemplary embodiments, the track_group_id is used to link a track group entry box to another track group entry box, and as such, FIG. 11 represents a use of embedded track group box features.

The track grouping tables 1002, 1003, 1004, 1005, and 1006 may be the same as FIG. 10, and the ISOBMFF moov box track grouping table 1101 may be represented in greater detailed by the following Table 9:

TABLE 9

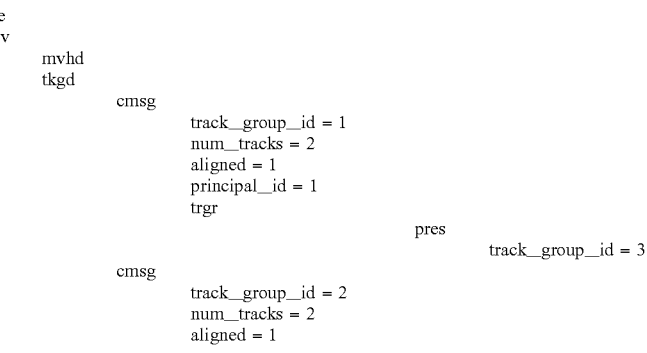

| ftype | | | | | |
|---|---|---|---|---|---|
| moov | | | | | |
| | mvhd | | | | |
| | tkgd | | | | |
| | | cmsg | | | |
| | | | track_group_id = 1 | | |
| | | | num_tracks = 2 | | |
| | | | aligned = 1 | | |
| | | | principal_id = 1 | | |
| | | | trgr | | |
| | | | | pres | |
| | | | | | track_group_id = 3 |
| | | cmsg | | | |
| | | | track_group_id = 2 | | |
| | | | num_tracks = 2 | | |
| | | | aligned = 1 | | |

TABLE 9-continued

```
                  principal_id = 1
                  trgr
                                        pres
                                              track_group_id = 3
        prse
                  track_group_id = 3
                  num_tracks = 2
                  Preselection_tag = "pr2"
```

As such, in FIG. 11, there is use of embedded track group box features since the track_group_id information of track grouping tables 1102 and 1003 may be signaled with the corresponding track_group_id of the ISOBMFF moov box track grouping table 1101. The track_group_id information of track grouping tables 1004, 1005, and 1006 in FIG. 11 may be signaled with the corresponding track_group_id of the ISOBMFF moov box track grouping table 1101, and a reference from cmsg boxes track_group_id of the ISOBMFF moov box of track grouping table 1101 in FIG. 11 is provided to the prse box thereof.

According to the embodiments of FIG. 11, there is provided text for ISOBMFF hereby such that its 8.3.4 Track group description box may be described as: The Track-GroupDescriptionBox provides an array of TrackGroupEntryBoxes, where each TrackGroupEntryBox provides detailed characteristics of a particular track group. The syntax of the TrackGroupEntryBox is determined by track_group_entry_type. TrackGroupEntryBox is mapped to the track group by a unique track_group_entry_type that is associated with a track_group_type defined in subclause 8.3.4.3. More than one TrackGroupEntryBox with a same track_group_entry_type may be present in TrackGroupDescriptionBox, and in that case TrackGroupEntryBoxes shall have different track_group_id.

It is further provided by embodiments herein additional text for ISOBMFF 8.3.4.1 Syntax as shown in example 1200 of FIG. 12.

According to the embodiments of FIG. 11, there is provided text for ISOBMFF hereby such that its 8.3.4.2 provides that the TrackGroupDescriptionBox contains TrackGroupEntryBoxes. The track_group_entry_type indicates a 4CC that is associated with a track_group_type. The pair o track_group_id and track_group_entry_type identifies the track group that the TrackGroupEntryBox describes. In order to indicate a hierarchical grouping of tracks, a TrackGroupEntryBox may contain one or more TrackGroupDescriptionBoxes. Each TrackGroupDescriptionBox indicates that the Track TrackGroupDescriptionBox Group Entry Box is a member of another track group, identified by the track_group_id of a TrackGroupDescription Box. And any track_group_id of any TrackGroupDescrptionBox of an ISOBMFF file shall have a unique value. And all attributes uniquely characterizing a preselection should be present in the PreselectionTrackGroupEntryBox for the preselection according to exemplary embodiments.

Figure 13:
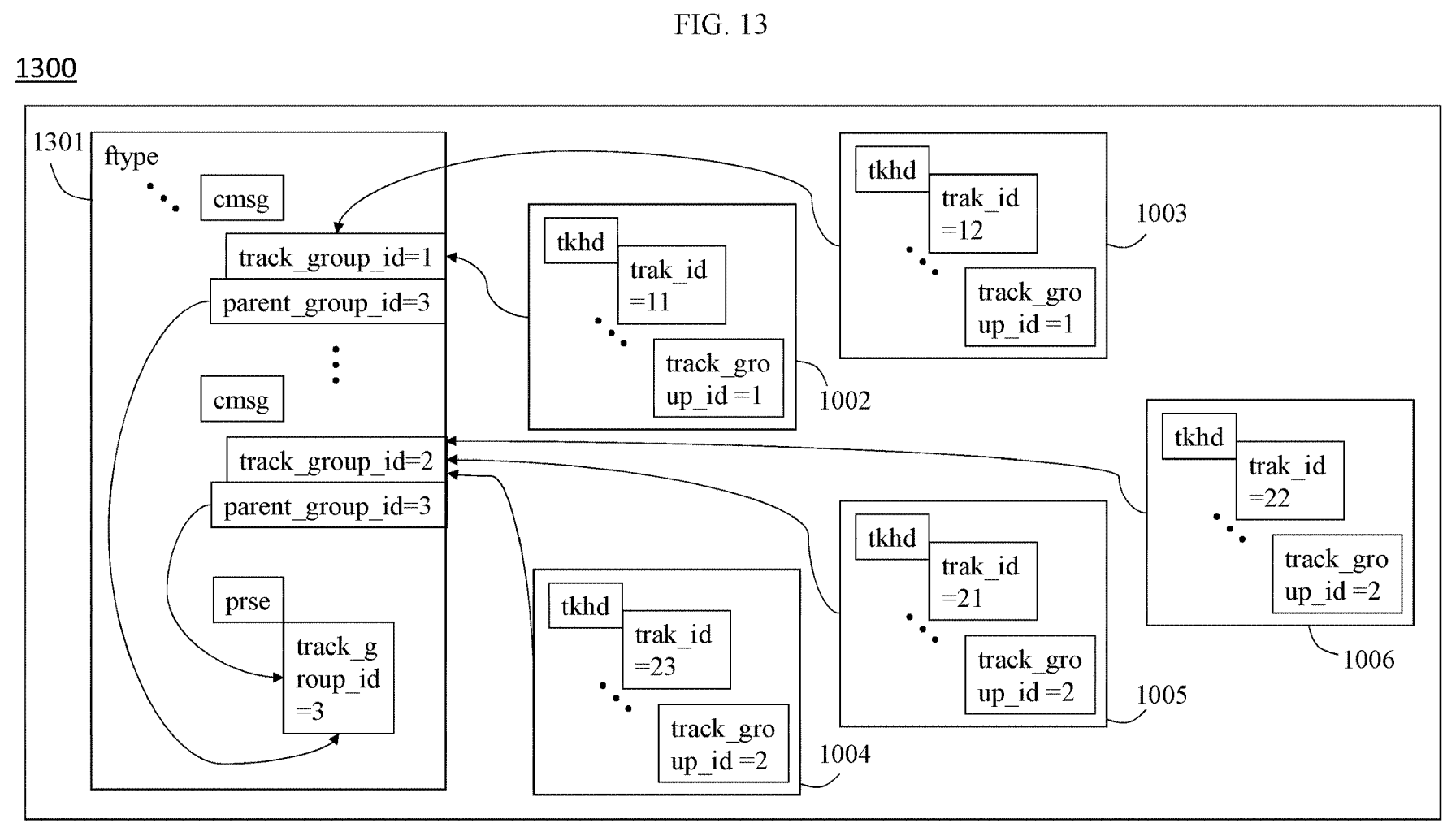

Another solution is to add a field in track group entry box as shown in the example 1300 of FIG. 13. The track grouping tables 1002, 1003, 1004, 1005, and 1006 may be the same as FIG. 10, and the ISOBMFF moov box track grouping table 1301 may be represented in greater detailed by the following Table 10:

TABLE 10

```
ftype
moov
        mvhd
```

TABLE 10-continued

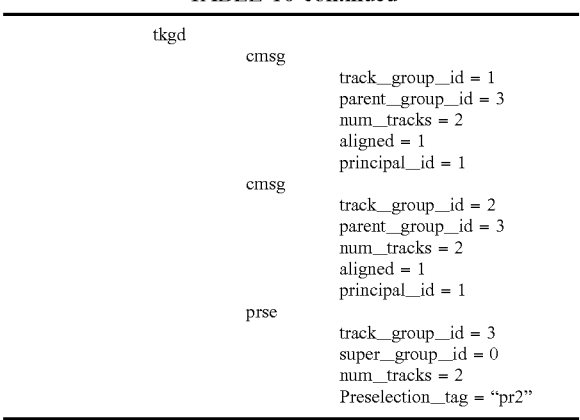

As such, in FIG. 13, there is use of an additional field in track group entry box. That is, there is the new super_group_id or parent_group_id that points to the preselection track group entry box that includes the CMAF track group boxes. The track_group_id information of track grouping tables 1102 and 1003 may be signaled with the corresponding track_group_id of the ISOBMFF moov box track grouping table 1301. The track_group_id information of track grouping tables 1004, 1005, and 1006 in FIG. 13 may be signaled with the corresponding track_group_id of the ISOBMFF moov box track grouping table 1301, and a reference from that additional field, super_group_id or parent_group_id, of the cmsg boxes of the ISOBMFF moov box of track grouping table 1301 in FIG. 13 is provided to the track_group_id of the prse box thereof. This solution works for the cases in which the child track group does not need to include additional information on its membership in the parent track group, for instance the track order or any order in the parent track group.

According to the embodiments of FIG. 13, there is provided text for ISOBMFF hereby such that the TrackGroupDescriptionBox provides an array of TrackGroupEntryBoxes, where each TrackGroupEntryBox provides detailed characteristics of a particular track group. The syntax of the TrackGroupEntryBox is determined by track_group_entry_type. TrackGroupEntryBox is mapped to the track group by a unique track_group_entry_type that is associated with a track_group_type defined in subclause 8.3.4.3. More than one TrackGroupEntryBox with the same track_group_entry_type may be present in TrackGroupDescriptionBox, in that case TrackGroupEntryBoxes shall have different track_group_id.

It is further provided by embodiments herein additional text for ISOBMFF 8.3.4.3 Syntax as shown in example 1400 of FIG. 14. The parent_group_id indicates this track group is a child of a parent track group with track_group_id of the identical value, i.e., the two TrackGroupEntryBoxes define hierarchical track grouping which consist of two levels: the top level is described by the parent TrackGroupEntryBox, and the lower level is described by the child TrackGroupEntryBox. The value of zero indicates that this track group does not have any parent track group. The TrackGroupDescriptionBox contains TrackGroupEntryBoxes. The track_group_entry_type indicates a 4CC that is associated with a track_group_type. The pair of track_group_id and track_group_entry_type_identifies the track group that the TrackGroupEntryBox describes.

Figure 15:
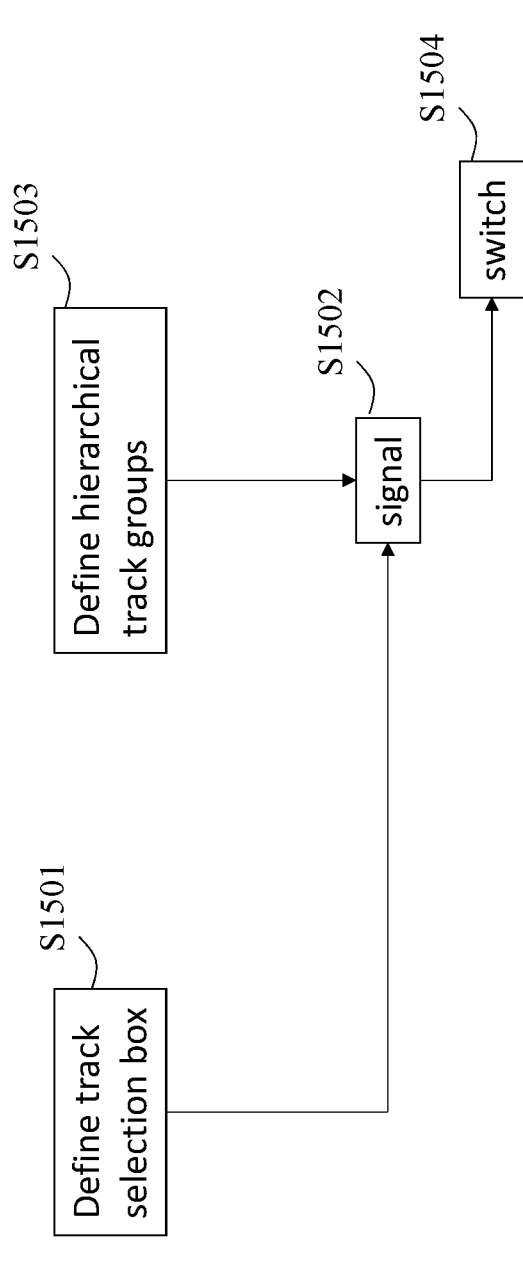
FIG. 15 is a simplified flowchart in accordance with embodiments.

Therefore, exemplary embodiments allow, as in the example 1500 of FIG. 15, the definition, at S1503, and use and signaling at S1502 of a track group box in the track group entry box enabling the hierarchical grouping of the track groups without addition of any new parameters. As such, there is provided a method of defining the hierarchical track groups in ISOBMFF files where a track group can be a member of another track group, wherein a multi-level grouping of tracks can be achieved, wherein the addition of the track group description box to the track group entry box allows the entry box to become a member of another track group box, and the properties of this track entry box as a member of the other track group box expressed, wherein a track entry box can be a member of more than one track group by including two or more track group boxes in it wherein such design allows flexible multi-level multi-branch hierarchical track grouping where a track group can be a member of multiple track groups and therefore share various and different properties with different track groups.

Further at S1504, since the CMAF switching set is to provide alternate representations of the same content in multiple tracks so that during the delivery or playback, the player can switch between tracks to accommodate the network bandwidth variation and other varying properties, a player may switch tracks based on the signaled features from S1502 based on any of the defined track selection box features from S1501 and the defined hierarchical track group features of S1503. The switch S1504 features involve playback of media and switching the playback of that media from one track to another based on any of the CMAF features disclosed herein.

The techniques described above, can be implemented as computer software using computer-readable instructions and physically stored in one or more computer-readable media or by a specifically configured one or more hardware processors. For example, FIG. 16 shows a computer system 1600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
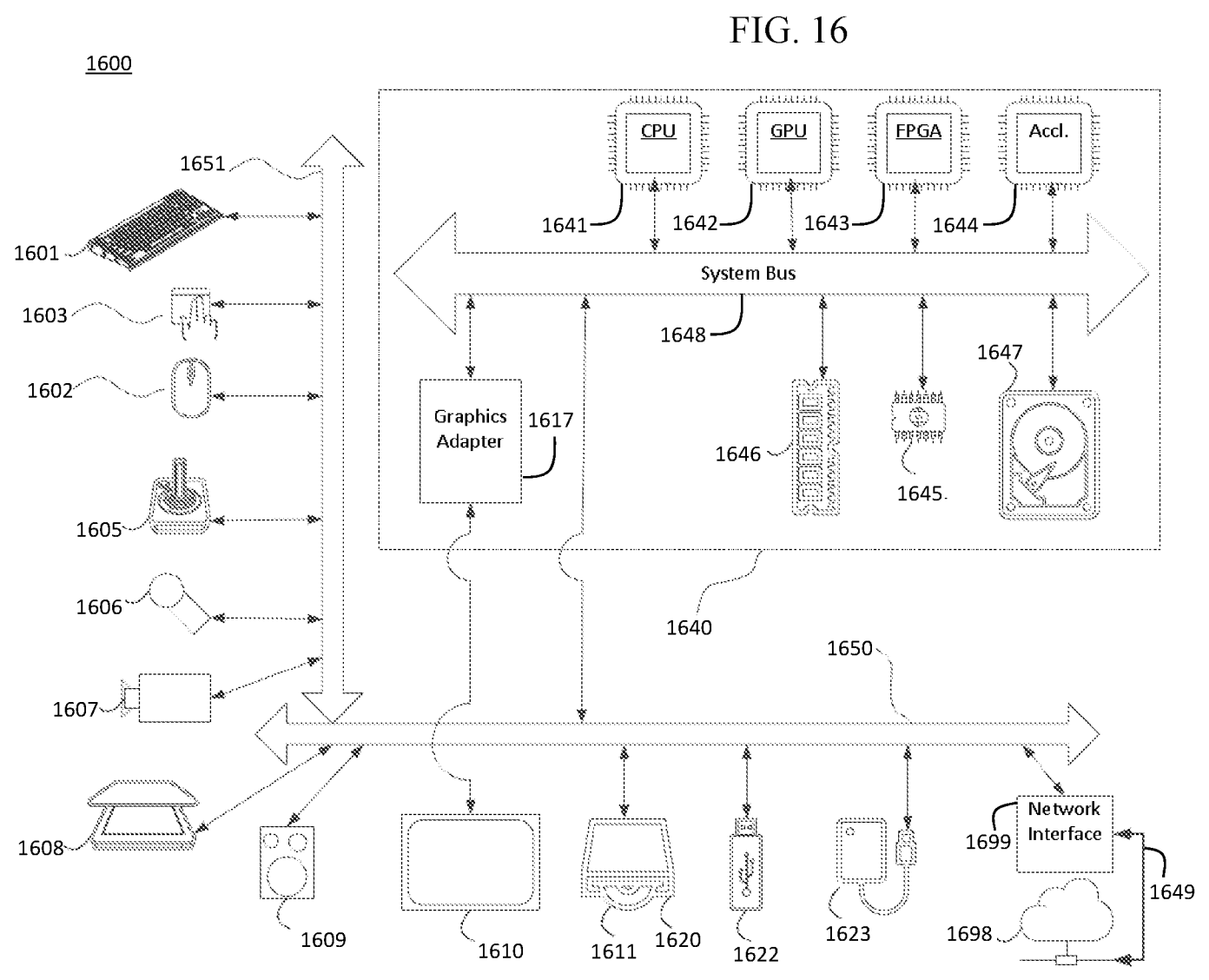

The components shown in FIG. 16 for computer system 1600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1600.

Computer system 1600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1601, mouse 1602, trackpad 1603, touch screen 1610, joystick 1605, microphone 1606, scanner 1608, camera 1607.

Computer system 1600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1610, or joystick 1605, but there can also be tactile feedback devices that do not serve as input devices), audio output devices (such as: speakers 1609, headphones (not depicted)), visual output devices (such as screens 1610 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1600 can also include human accessible storage devices and their associated media such as optical media including CD/DVD ROM/RW 1620 with CD/DVD 1611 or the like media, thumb-drive 1622, removable hard drive or solid state drive 1623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1600 can also include interface 1699 to one or more communication networks 1698. Networks 1698 can for example be wireless, wireline, optical. Networks 1698 can further be local, wide-area, metropolitan, vehicular and industrial, real-time, delay-tolerant, and so on. Examples of networks 1698 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1698 commonly require external network interface adapters that attached to certain general-purpose data ports or peripheral buses (1650 and 1651) (such as, for example USB ports of the computer system 1600; others are commonly integrated into the core of the computer system 1600 by attachment to a system bus as described below (for example Ethernet interface into a PC computer system or cellular network interface into a smartphone computer system). Using any of these networks 1698, computer system 1600 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1640 of the computer system 1600.

The core 1640 can include one or more Central Processing Units (CPU) 1641, Graphics Processing Units (GPU) 1642, a graphics adapter 1617, specialized programmable processing units in the form of Field Programmable Gate Areas (FPGA) 1643, hardware accelerators for certain tasks 1644, and so forth. These devices, along with Read-only memory (ROM) 1645, Random-access memory 1646, internal mass storage such as internal non-user accessible hard drives, SSDs, and the like 1647, may be connected through a system bus 1648. In some computer systems, the system bus 1648 can be accessible in the form of one or more physical plugs to enable extensions by additional CPUs, GPU, and the like. The peripheral devices can be attached either directly to the core's system bus 1648, or through a peripheral bus 1651. Architectures for a peripheral bus include PCI, USB, and the like.

CPUs 1641, GPUs 1642, FPGAs 1643, and accelerators 1644 can execute certain instructions that, in combination, can make up the aforementioned computer code. That computer code can be stored in ROM 1645 or RAM 1646. Transitional data can be also be stored in RAM 1646, whereas permanent data can be stored for example, in the internal mass storage 1647. Fast storage and retrieval to any of the memory devices can be enabled through the use of cache memory, that can be closely associated with one or more CPU 1641, GPU 1642, mass storage 1647, ROM 1645, RAM 1646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1600, and specifically the core 1640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1640 that are of non-transitory nature, such as core-internal mass storage 1647 or ROM 1645. The software implementing various embodiments of the present disclosure can be stored in such devices and executed by core 1640. A computer-readable medium can include one or more memory devices or chips, according to particular needs. The software can cause the core 1640 and specifically the processors therein (including CPU, GPU, FPGA, and the like) to execute particular processes or particular parts of particular processes described herein, including defining data structures stored in RAM 1646 and modifying such data structures according to the processes defined by the software. In addition or as an alternative, the computer system can provide functionality as a result of logic hardwired or otherwise embodied in a circuit (for example: accelerator 1644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding media, the method being performed by at least one processor, the method comprising:
    obtaining International Organization for Standardization base media file format (ISOBMFF) files associated with a video data;
    determining, from the ISOBMFF files, a track selection box indicating properties of switching sets of the ISOBMFF files and a track group box indicating a hierarchical grouping of track groups, of which
    the track selection box specifies:
        a group of tracks, a switch group of groups, including the group of tracks, of the ISOBMFF files, whether the switch group of the groups belongs to another group, an aligned common media application format (CMAF) switching set, a CMAF switching set with a single initialization segment for all of the tracks, whether an initialization segment may be used for any track in the switch group, and a CMAF structural brand of the tracks,
    the track group box specifies:
        the CMAF switching set, the CMAF switching set with the single initialization segment for all of tracks of the ISOBMFF files, that the initialization segment may be used for any track in the switch group, and the CMAF structural brand of the tracks, and
    the track group box is included in a track group description box comprising an array of track group entry boxes each of which indicating characteristics of ones of track groups including the group of tracks; and
    decoding the video data based on the track selection box and the track group box.

2. The method according to claim 1, wherein the track selection box is contained in a user data box of a track that the track selection box modifies.

3. The method according to claim 1, wherein the track group box specifies that a track grouped by a CMAF switching track group is a track with an alternate group equal to an ID of the CMAF switching track group.

4. The method according to claim 1, wherein the track group box indicates a reference from a cmsg box to a prse box of an ISOBMFF moov box, and all CMAF switching groups with at least one contributing track having a track_in_movie flag set to 1 are qualified by CMAFSwitchingGroupEntryBoxes describing only track groups identified by a track_group_type equal to cmsg.

5. The method according to claim 1,
wherein the track group description box comprises another track group entry box, other than the track group entry boxes of the array of track group entry boxes, pointing to a preselection track group entry box comprising CMAF track group boxes.

6. The method according to claim 5,
wherein a second track group entry box, of the array of track group entry boxes of the track group description box, comprises a same track group entry type as the track group entry box and comprises a different track group identifier than the track group entry box.

7. The method according to claim 6,
wherein the same track group entry type indicates a 4CC code.

8. A apparatus for video streaming, the apparatus comprising:
at least one memory configured to store computer program code;
at least one processor configured to access the computer program code and operate as instructed by the computer program code, the computer program code including:
obtaining code configure to cause the at least one processor to obtain International Organization for Standardization base media file format (ISOBMFF) files associated with a video data;
determining code configure to cause the at least one processor to determine from the ISOBMFF files a track selection box indicating properties of switching sets of the ISOBMFF files and a track group box indicating a hierarchical grouping of track groups, of which
the track selection box specifies:
a group of tracks, a switch group of groups, including the group of tracks, of the ISOBMFF files, whether the switch group of the groups belongs to another group, an aligned common media application format (CMAF) switching set, a CMAF switching set with a single initialization segment for all of the tracks, whether an initialization segment may be used for any track in the switch group, and a CMAF structural brand of the tracks,
the track group box specifies:
the CMAF switching set, the CMAF switching set with the single initialization segment for all of tracks of the ISOBMFF files, that the initialization segment may be used for any track in the switch group, and the CMAF structural brand of the tracks, and
the track group box is included in a track group description box comprising an array of track group entry boxes each of which indicating characteristics of ones of track groups including the group of tracks; and
decoding code configure to cause the at least one processor to decode the video data based on the track selection box and the track group box.

9. The apparatus according to claim 8,
wherein the track selection box is contained in a user data box of a track that the track selection box modifies.

10. The apparatus according to claim 8,
wherein the track group box specifies that a track grouped by a CMAF switching track group is a track with an alternate group equal to an ID of the CMAF switching track group.

11. The apparatus according to claim 8,
wherein the track group box indicates a reference from a cmsg box to a prse box of an ISOBMFF moov box, and all CMAF switching groups with at least one contributing track having a track_in_movie flag set to 1 are qualified by CMAFSwitchingGroupEntryBoxes describing only track groups identified by a track_group_type equal to cmsg.

12. The apparatus according to claim 8,
wherein the track group description box comprises another track group entry box, other than the track group entry boxes of the array of track group entry boxes, pointing to a preselection track group entry box comprising CMAF track group boxes.

13. The apparatus according to claim 12,
wherein a second track group entry box, of the array of track group entry boxes of the track group description box, comprises a same track group entry type as the track group entry box and comprises a different track group identifier than the track group entry box.

14. A non-transitory computer readable medium storing a program causing a computer to execute a process, the process comprising:
obtaining International Organization for Standardization base media file format (ISOBMFF) files associated with a video data;
determining from the ISOBMFF files a track selection box indicating properties of switching sets of the ISOBMFF files and a track group box indicating a hierarchical grouping of track groups, of which
the track selection box specifies:
a group of tracks, a switch group of groups, including the group of tracks, of the ISOBMFF files, whether the switch group of the groups belongs to another group, an aligned common media application format (CMAF) switching set, a CMAF switching set with a single initialization segment for all of the tracks, whether an initialization segment may be used for any track in the switch group, and a CMAF structural brand of the tracks,
the track group box specifies:
the CMAF switching set, the CMAF switching set with the single initialization segment for all of tracks of the ISOBMFF files, that the initialization segment may be used for any track in the switch group, and the CMAF structural brand of the tracks, and
the track group box is included in a track group description box comprising an array of track group entry boxes each of which indicating characteristics of ones of track groups including the group of tracks; and
decoding the video data based on the track selection box and the track group box.

* * * * *